United States Patent
Béliveau et al.

(12) 
(10) Patent No.: US 6,731,598 B1
(45) Date of Patent: May 4, 2004

(54) VIRTUAL IP FRAMEWORK AND INTERFACING METHOD

(75) Inventors: André Béliveau, Laval (CA); Per Andersson, Westmount (CA); Anders Franzen, Traangsund (SE); Lars Hennert, Spånga (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 776 days.

(21) Appl. No.: 09/675,035

(22) Filed: Sep. 28, 2000

(51) Int. Cl.[7] .............................................. G01R 31/08
(52) U.S. Cl. ..................................... 370/228; 370/242
(58) Field of Search ................................ 370/216–228, 370/235, 236.2, 237, 241–252, 351.3, 400, 411; 714/100, 1, 2, 25, 47, 48

(56) References Cited

U.S. PATENT DOCUMENTS

| | | | | |
|---|---|---|---|---|
| 6,073,176 A | * | 6/2000 | Baindur et al. | 709/227 |
| 6,373,838 B1 | * | 4/2002 | Law et al. | 370/352 |
| 2001/0052021 A1 | * | 12/2001 | Bolosky et al. | 709/233 |
| 2002/0010866 A1 | * | 1/2002 | McCullough et al. | 713/201 |

FOREIGN PATENT DOCUMENTS

| | | |
|---|---|---|
| EP | 0865180 A2 | 9/1998 |
| GB | 2338870 A | 5/1999 |
| WO | WO 99/33227 | 7/1999 |

* cited by examiner

Primary Examiner—David Vincent
(74) Attorney, Agent, or Firm—Steven W. Smith; Sandra Beauchesne

(57) ABSTRACT

An interfacing method and Virtual Internet Protocol (VIP) Framework that provides high fault tolerance and linear scalability of servers and network interfaces. The Framework has minimal impact on the surrounding network infrastructure. The preferred embodiment operates at the IP level, thus enabling the Framework to operate with any application that runs on top of IP. Incoming data packets and packet fragments are received from the Internet in a plurality of network terminations. Routing processes provide external routers with addresses of the network terminations. Each network termination is associated with one of a plurality of forwarding processes, and each forwarding process is connected to a plurality of fragmenter/de-fragmenters. Each forwarding process selects a single fragmenter/de-fragmenter to receive all of the incoming data packets and packet fragments having a common source address. The incoming packets and packet fragments are then sent to the selected fragmenter/de-fragmenter where they are reassembled if necessary. The selected fragmenter/de-fragmenter identifies a valid application server and sends the reassembled incoming data packets to the identified server. Servers with outgoing messages select a fragmenter/de-fragmenter which fragments the data packets if required, and uses the routing process to select a forwarding process to route the packets and fragments to a network termination and the Internet.

17 Claims, 5 Drawing Sheets

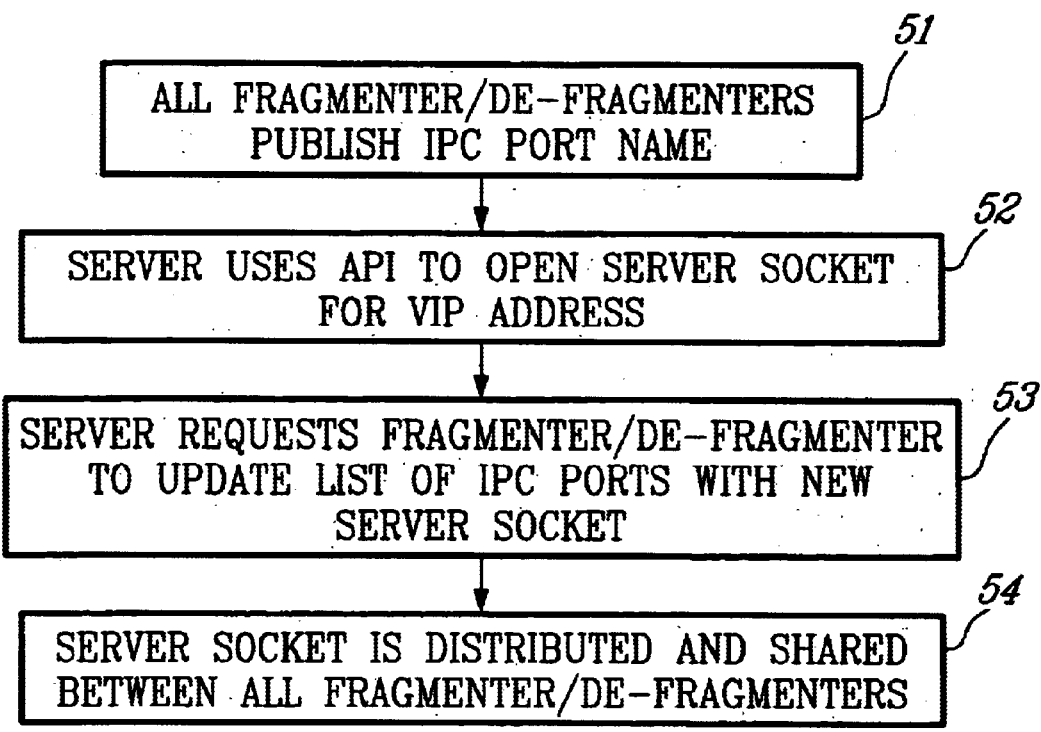

VIRTUAL IP FRAMEWORK AND INTERFACING METHOD

BACKGROUND OF THE INVENTION

1. Technical Field of the Invention

This invention relates to communication systems and, more particularly, to a virtual Internet Protocol (IP) Framework and interfacing method that provides a fault-tolerant and scalable interface between a plurality of servers and a packet data network such as the Internet.

2. Description of Related Art

Many companies now build a large percentage or all of their revenue stream through business conducted over the Internet. These companies, therefore, require access and switching technology with very high reliability. If these companies lose Internet access for even a short period, they lose a large amount of revenue. Thus, increasing the fault tolerance of Internet access technology is highly desirable. Additionally, these types of companies need network access technology that allows for growth in their data trafficking needs. If they need to obtain more bandwidth, for example, they need to be able to do this easily. Therefore, a solution providing scalability is also desirable.

Different technologies that exist in the IP world today all have problems or limitations. Systems that address only fault tolerance generally cannot be combined with systems emphasizing scalability to achieve both requirements because the portion of the system emphasizing scalability is not fault tolerant, and this negatively impacts the fault tolerance of the entire system. Generally, one of the requirements is traded off against the other.

When clients are accessing a Web server, for example, a browser first gets the name of the Uniform Resource Locator (URL) translated into a unique IP address using a Domain Name Server (DNS). The unique IP address then enables the client to reach the server that will handle its Hypertext Transfer Protocol (HTTP) request. A solution is needed, therefore, that presents a single IP address to the clients. The solution should provide scalability and fault tolerance, and should impose no additional requirements on the clients. Furthermore, the solution should not be limited specifically to HTTP traffic or TCP traffic. It is desirable that the solution be applicable to all types of IP traffic.

There exists in the market a Round Robin DNS that provides a degree of scalability. The Round Robin DNS provides, for the same URL name, a different IP address each time. The DNS can use any algorithm to balance the load between the different servers. Additional servers may be added, and the DNS will distribute the load over the larger number of servers. The Round Robin DNS solution, however, has the limitation that the client must make a DNS request in order to guarantee a balanced distribution. The clients have the capability to cache the IP address, and for future accesses may use the cached IP address rather than obtaining a new IP address from the DNS. This can defeat the scalability feature because whenever the client caches the IP address returned by the DNS, the Round Robin DNS cannot guarantee the distribution. The fault tolerance of the system can also be adversely affected if the client caches a server's IP address and that server later develops a fault. Thus, the scalability and fault tolerance are bound by the behavior of the client. It is desirable to provide scalability and fault tolerance without constraints on clients. Therefore the Round Robin DNS is not sufficient.

Another solution is to route every message to a focal point that redirects the packets to different end-hosts. This type of solution is shown in WO 99/33227 in which a network flow switch (NFS) is utilized. However, this solution does not allow the capacity of the system to be increased since the NFS is a limiting factor. The NFS is implemented like a standard router having network cards and Internet controllers controlled by a CPU, with traffic going between the CPU and the cards. A capacity limitation in the CPU, therefore, could limit overall system capacity. The NFS is also a single point of failure greatly reducing the system's fault tolerance.

In EP 0 865 180 A2, two alternatives are described for distributing requests to a plurality of servers, but neither of the alternatives provides scalability. In one alternative, a Dispatcher is used to direct incoming traffic. A router requests the Dispatcher to determine which server should take the traffic. The Dispatcher is a single point, and when its capacity is fully utilized, additional servers cannot be added. The Dispatcher also routes the data, so it is a single point of failure, thereby reducing fault tolerance of the system. The other alternative uses broadcasting over a bus. However, if the bandwidth of the bus is limited, the scalability of the system is similarly limited.

Another product known as a LocalDirector also provides a single focal point that guarantees correct packet reassembly before the packets reach an end-host. The LocalDirector acts as a VIP termination and then forwards the request to the real end-host using either:

1. MAC address translation. All end-hosts support the VIP termination. The LocalDirector transmits an IP datagram to a specific end-host using the MAC address of this end-host. The end-host can then transmit in the reverse direction directly to the originating end.
2. Tunneling. IP datagrams are encapsulated in another protocol layer in order to forward them to the end-host. The end-host must support this encapsulation. Then the end-host can transmit in the reverse direction directly to the originating end or go through the LocalDirector.
3. Network Address Translation (NAT). The LocalDirector modifies the IP header replacing the VIP address with the real IP address of the target end-host. The end-host has to transmit in the reverse direction to the LocalDirector.

The problem with implementations such as the LocalDirector is that they use "hot standby" techniques to solve the fault tolerance problem. Hot standby systems maintain a fully capable secondary system that is ready to take over if the primary system fails. This addresses fault tolerance, but does not address scalability since the capacity of the primary or the secondary system limits the system capacity. Therefore an architecture using a LocalDirector does not meet the scalability requirement.

In order to overcome the disadvantage of existing solutions, it would be advantageous to have a Virtual IP (VIP) Framework that provides a fault-tolerant and scalable interface between a plurality of servers and a packet data network such as the Internet. Additionally, the Framework would have limited impact on clients, application designers, and the existing network infrastructure. Finally, the Framework would be applicable to multiple protocols. The present invention provides such a Framework.

SUMMARY OF THE INVENTION

The present invention is an interfacing method and Framework that provides high fault tolerance and linear scalability of the servers and the network interfaces. The Framework is transparent to the clients and the servers, and has minimal impact on the surrounding network infrastructure. In addition, since the preferred embodiment operates at the IP level, the invention can operate with any application that runs on top of IP.

Thus, in one aspect, the present invention is a fault-tolerant and scalable method of interfacing a plurality of application servers with a packet data network (PDN). For incoming messages, the method begins by receiving in a plurality of network terminations, incoming data packets and packet fragments from the PDN. Each of the network terminations are associated with one of a plurality of forwarding processes, and each of the forwarding processes is connected to a plurality of fragmenter/de-fragmenters. Each forwarding process then selects a single fragmenter/de-fragmenter to receive all of the incoming data packets and packet fragments having a common source address. This is followed by sending the incoming data packets and packet fragments having a common source address to the selected fragmenter/de-fragmenter, where incoming data packets are reassembled out of the incoming packet fragments received from the forwarding processes. Each of the fragmenter/de-fragmenters is, in turn, connected to the plurality of application servers, and the selected fragmenter/de-fragmenter identifies a valid application server to receive the reassembled incoming data packets. The selected fragmenter/de-fragmenter then sends the reassembled incoming data packets to the valid application server.

For outgoing messages, the method begins when the valid application server selects a fragmenter/de-fragmenter from the plurality of fragmenter/de-fragmenters. This is followed by sending outgoing data packets from the valid application server to the selected fragmenter/de-fragmenter, and identifying by the selected fragmenter/de-fragmenter, a single forwarding process from the plurality of forwarding processes. The selected fragmenter/de-fragmenter then sends the outgoing data packets to the identified forwarding process which associates the outgoing data packets with a network termination. The outgoing data packets are then sent from the associated network termination to the PDN.

In another aspect, the present invention is a Framework for providing a fault-tolerant and scalable interface that receives incoming data packets and packet fragments from a PDN and passes reassembled packets to a plurality of application servers. The Framework includes a plurality of network terminations that receive incoming data packets and packet fragments from the PDN, and a plurality of forwarding processes that are associated with the network terminations. Each of the forwarding processes includes means for identifying a single de-fragmenter from a plurality of de-fragmenters to receive all of the incoming data packets and packet fragments having a common source address. Each de-fragmenter includes means for reassembling incoming data packets out of incoming packet fragments, and means for identifying a valid application server to receive the reassembled incoming data packets. A plurality of interprocess communication (IPC) links connects each of the de-fragmenters with each of the application servers, and a plurality of IPC links connect each of the de-fragmenters with each of the forwarding processes. The Framework may also include a routing process that contains a list of VIP Forwarders that can be used to reach specific client IP addresses. The routing process provides external routers in the PDN with addresses of the network terminations.

In yet another aspect, the present invention is a Framework for providing a fault-tolerant and scalable interface that receives outgoing data packets from a plurality of application servers and passes outgoing data packets and packet fragments to a PDN. A plurality of IPC links connect each of the application servers to a plurality of fragmenters. The application server originating the data packets selects a fragmenter and sends the outgoing data packets to the selected fragmenter. Each of the fragmenters includes means for fragmenting outgoing data packets into outgoing packet fragments, and means for identifying a forwarding process from a plurality of forwarding processes. A routing process may be utilized to provide the fragmenters with outgoing routing information for outgoing data packets. A plurality of IPC links connect each of the fragmenters with each of the forwarding processes, and the selected fragmenter sends the outgoing data packets and packet fragments to the identified forwarding process for forwarding to a network termination. The network termination then sends the outgoing data packets and packet fragments to the PDN.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 3 is a flow chart illustrating the steps for maintaining an updated list associating IPC ports with VIP address/server socket combinations.

DETAILED DESCRIPTION OF EMBODIMENTS

Figure 1:
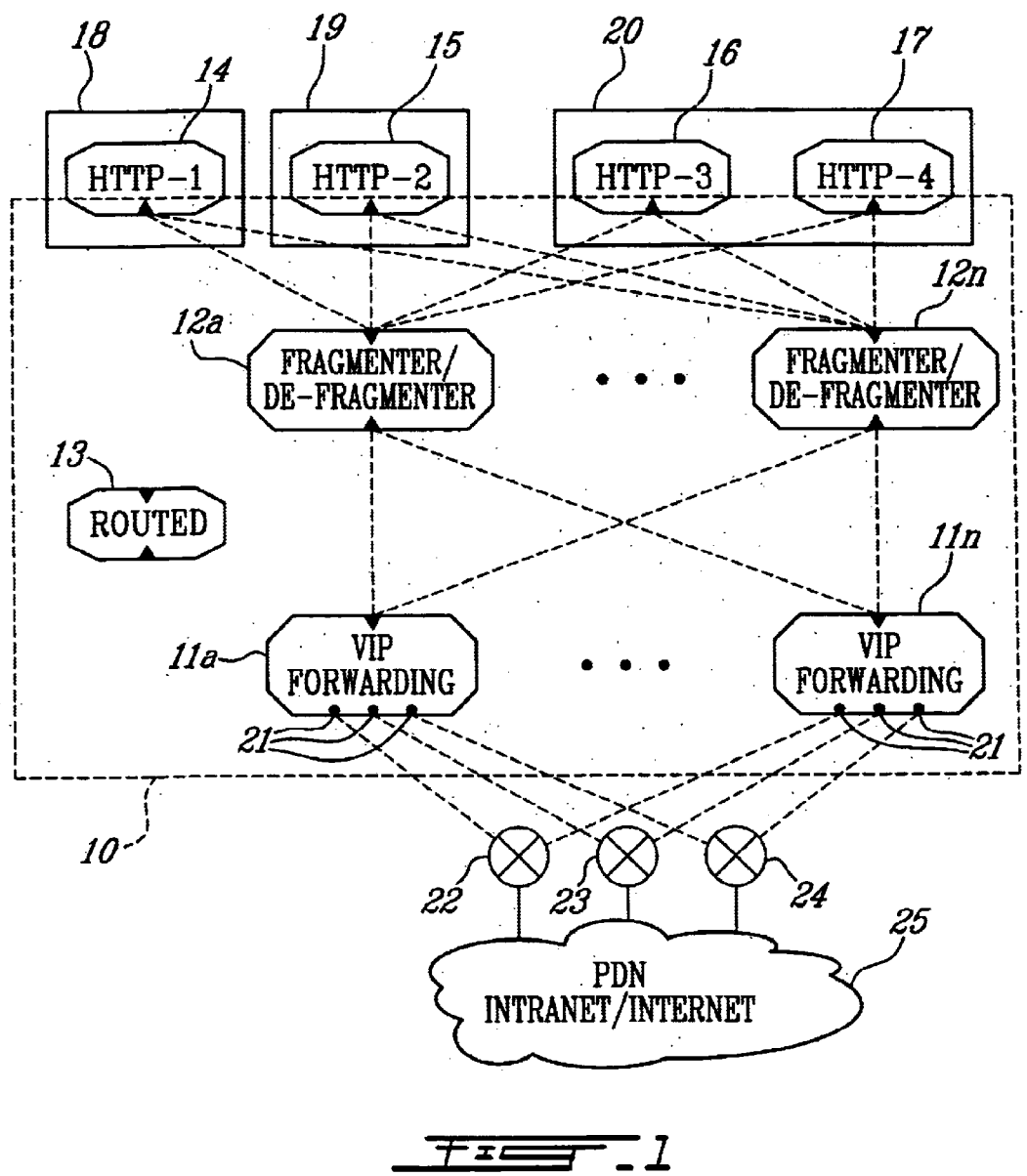
FIG. 1 is a simplified,block diagram of the Virtual IP (VIP) Framework of the present invention.

The present invention is a Framework that provides a fault-tolerant and scalable interface between a plurality of servers and a packet data network (PDN). The Framework may be used with multiple protocols, and has limited impact on users and the existing infrastructure of the PDN. In the preferred embodiment, the Framework is a Virtual IP (VIP) Framework that may be used with any higher level protocol that runs on top of the Internet Protocol (IP). For example, the VIP Framework may be used to interface with the Internet, servers running on the Transmission Control Protocol (TCP), User Datagram Protocol (UDP), File Transfer Protocol (FTP), or Hypertext Transfer Protocol (HTTP) which runs on top of the Internet Protocol (IP). Thus, the present invention is designed to run at the IP level while providing both fault tolerance and scalability. In this way, the solution can be applied to all of the other applications that run on top of IP.

In addition, the Framework is transparent to processes outside of the Framework, and neither clients nor servers are aware of the VIP Framework. Applications on top of the Framework continue to run as normal, and application designers continue to use the same Application Programming Interface (API) from the operating system to open sockets, close sockets, read data, and so on. The applications see no difference regarding the protocol layers below them. Form the network point of view, external routers see the Framework as merely more routers, and interface with the Framework as normal.

With the VIP Framework, as many Web servers as needed to handle the traffic demand may be started, with all of the Web servers serving the same VIP address. Therefore a VIP address is defined centrally in the VIP Framework for use by all servers. The Framework, however, is capable of supporting more than one VIP address, and can host more than one Web site. Therefore a local routing table is set up in a Routed process that contains a list of VIP Forwarders 11 that can be used to reach specific client IP addresses.

When starting a Web server, the software uses an API from the operating system to open a TCP server socket that serves as a listening port. The IP address used in the API can be set to "all" available IP addresses or it can be set explicitly. In programs such as Jigsaw (a Web server platform), there is a configuration file for each server that tells the software which IP address to use when opening this server socket. Jigsaw provides a sample HTTP 1-1 implementation and a variety of features on top of an advanced architecture implemented in Java. Another API enables a server to discover which IP address can be served on a particular host. The list of supported VIP addresses, therefore, is made available through this API on all the processors in the Framework. In this way VIP server sockets can be started on any processor in the Framework.

The VIP Framework also enables the network capacity to be expanded by adding more network cards. It is important to note that the network capacity increase should not be tied to the server capacity increase. In other words, the location of the server software needs to be decoupled from the location of the network interface cards. Therefore, unlike prior art systems which assume that the IP stack terminates on the same processor where the TCP server socket owner resides, in the VIP Framework, the IP stack does not necessarily terminate on the same processor where the application will serve the request.

FIG. 1 is a simplified block diagram of the Virtual IP (VIP) Framework 10 of the present invention. The VIP Framework provides a distributed IP stack that includes three basic process types: VIP Forwarding, Fragmentation/De-fragmentation, and Routing. These are shown as a plurality of VIP Forwarders 11a through 11n, a plurality of Fragmenter/De-fragmenters 12a through 12n, and Routed process 13. The Routed process includes a local routing table that contains a list of VIP Forwarders 11 that can be used to reach specific client IP addresses. The Routed process contains information that is common/global to all processors, but is also available on each processor through local instances of the Routed process. Processes are illustrated in the figure by octagons; black circles represent network interface cards such as Ethernet cards that re-route IP packets; and triangles represent interfaces using an internal interprocess communications (IPC) protocol. Other protocols performing the same functions may also be utilized.

A plurality of Web servers such as HTTP-1 (14), HTTP-2 (15), HTTP-3 (16) and HTTP-4 (17) may be connected by IPC to the Fragmenter/De-fragmenters 12. HTTP-1 and HTTP-2 are illustrated as running on separate processors 18 and 19, respectively, while HTTP-3 and HTTP-4 are illustrated as running on the same processor 20. Although only four servers are illustrated, the Framework is scalable, and more servers may be added in order in increase system capacity. In addition, although only HTTP servers have been shown, the applications on top may include any server application that runs on IP such as a Web server or an FTP server for file transfer.

The VIP Forwarders are associated with network terminations such as Ethernet cards 21 which connect to a plurality of external routers 22–24. The external routers, in turn, connect to a packet data network (PDN) 25 such as an intranet or the Internet. Each of the external routers can connect to any of the Ethernet cards (and associated VIP Forwarders); each of the VIP Forwarders can connect to any of the Fragmenter/De-fragmenters; and each of the Fragmenter/De-fragmenters can connect to any of the servers. As an example, a solid line has been drawn representing a connection from external router 23, to VIP Forwarder 11a, to Fragmenter/De-fragmenter 12a, and to the HTTP-2 server 15.

For each processor that physically has a network termination (for example, an Ethernet card) that connects to the Internet, a VIP Forwarding process resides on that processor. Actually, each card used as a VIP termination has a corresponding VIP Forwarding process. Cards can be configured for VIP termination at run time. Each VIP termination may terminate all the IP addresses defined in the Routed process 13. Alternatively it may be specified that certain VIP terminations will only terminate specific VIP addresses.

Note that the network terminations 21 are configured with an IP address that is defined locally (per processor) regardless of whether or not such a termination is used for a VIP address. The external routers 22–24 are informed which terminations support the VIP address by the Routed process 13 using, for example, the Routing Information Protocol (RIP). Part of the scalability of the invention comes from the fact that there can be a number of physical terminations such as Ethernet cards that can be on a number of different processors. Typically, an IP address refers to a card or an IP termination. Usually, for each Ethernet address, a different IP address is assigned. The invention does the same. The external routers see each and every card as a separate address. So, the VIP Framework looks to the external routers like other routers in the network, and they route data to them as desired. Once the data gets into the Framework, an Ethernet layer receives the data and verifies its layer-1 information. When the data goes to the IP stack, the stack is distributed.

Figure 2A:
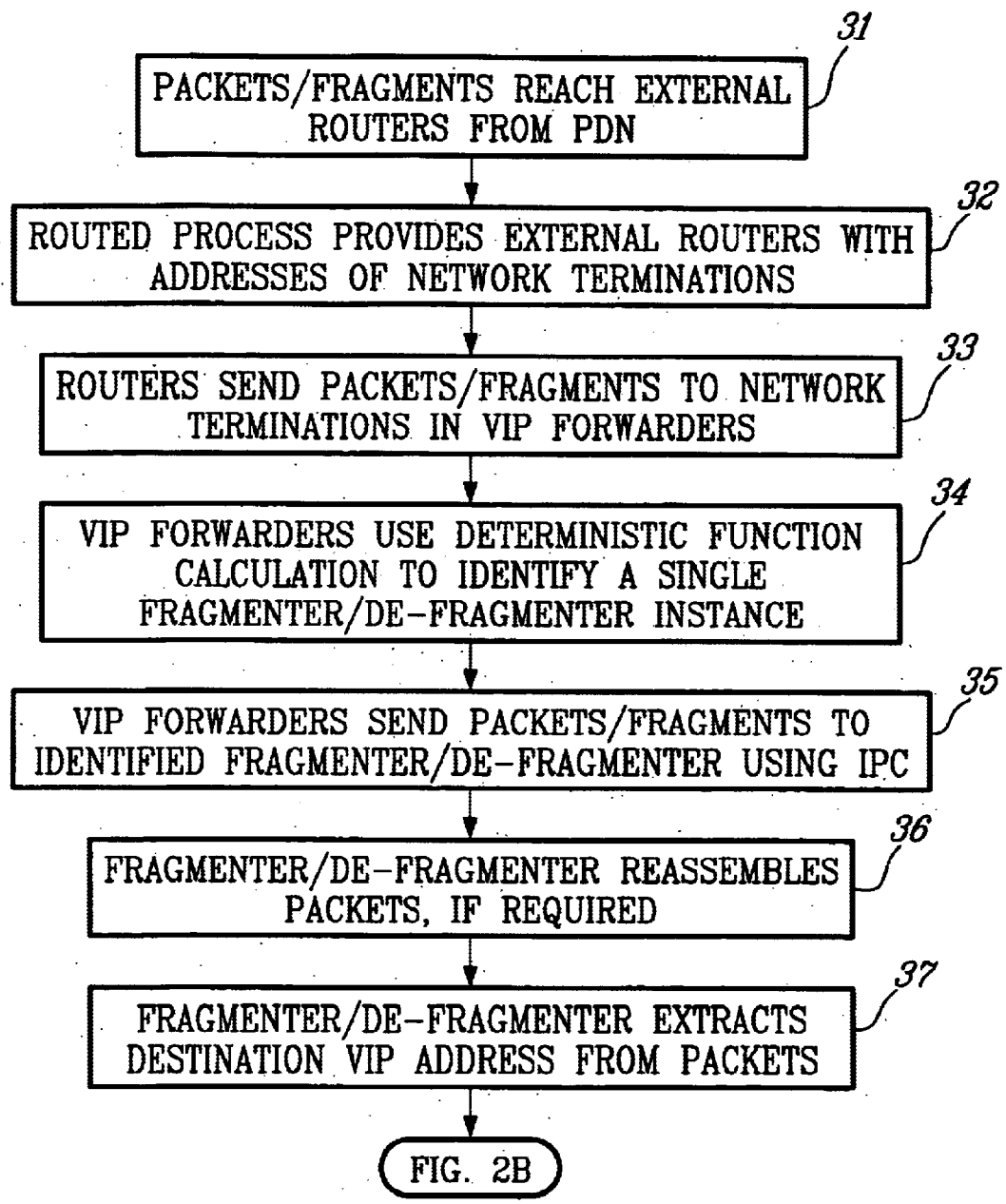
FIGS. 2A and 2B are a flow chart illustrating the steps of the preferred embodiment of the method of the present invention when an incoming message is received in the VIP Framework from a packet data network.
Figure 2B:
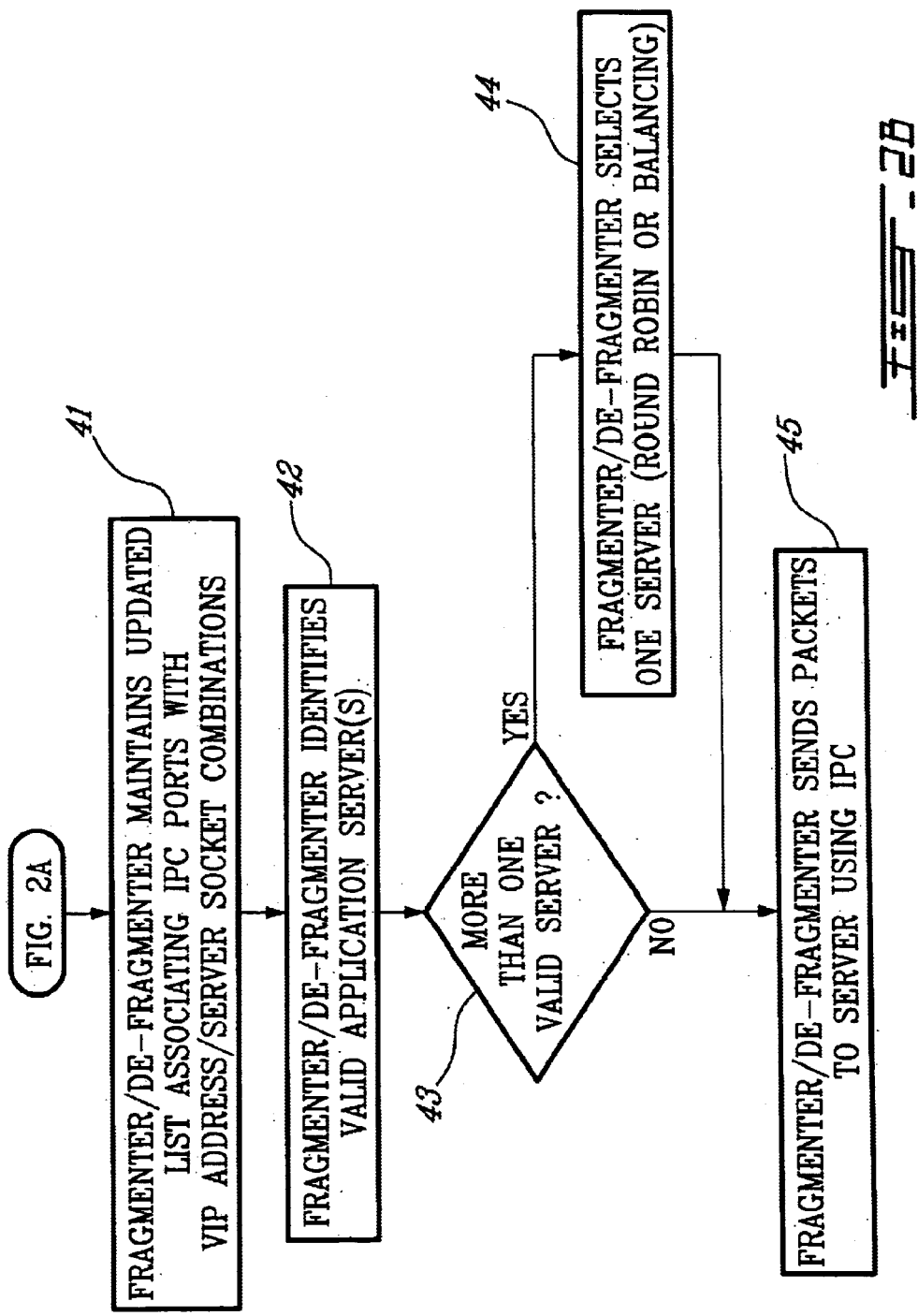

FIGS. 2A and 2B are a flow chart illustrating the steps of the preferred embodiment of the method of the present invention when an incoming message is received in the VIP Framework 10 from the PDN 25. Referring first to FIG. 2A, packets/fragments reach the external routers 22–24 from the PDN (Intranet/Internet) 25 at step 31. As noted above, and indicated in step 32, the external routers are informed by the Routed process 13 which terminations support the VIP address indicated in the packets. At step 33, the packets/fragments are then sent to the supporting network terminations 21 and their associated VIP Forwarders 11. However, since packets may have been fragmented (sliced into smaller frames), fragments may take different routes to enter the VIP Framework. Received fragments must be de-fragmented (reassembled) before they are sent up to the TCP and application layers. The reassembly of the packets must occur in a common place. Reassembly cannot be performed by any single VIP Forwarding process since that process may not be aware of all the fragmented frames. Therefore reassembly of incoming packets is performed at the Fragmenter/De-fragmenter level 12.

All packets received by the VIP Forwarders 11 are forwarded, using for example IPC, to a predetermined Fragmenter/De-fragmenter 12 even if the packets do not need any reassembly (de-fragmentation). In order to avoid the creation of a bottleneck in the Framework, the present invention creates a plurality of instances of the Fragmenter/De-fragmenter process which are always active. For example, the Framework may include 256 instances of the process. These Fragmenter/De-fragmenter process instances are distributed in the Framework, and run on multiple processors. For example, there may be 128 instances running on each of 2 processors, 64 instances running on each of 4 processors, or at the extreme, 1 instance on each of 256 processors. The number 256 is exemplary only, and there may be a greater or lesser number of instances in actual practice. The number may be increased or decreased if necessary.

All IP packets coming from the same source (including each packet fragment) contain the same source IP address. At step 34, the source IP address is used in a deterministic function calculation to determine which Fragmenter/De-fragmenter instance 12 is to be used to reassemble the packets. Through the deterministic function calculation, all packets coming from a particular source IP address are always sent to the same Fragmenter/De-fragmenter process instance at step 35. All VIP Forwarding process instances 11 utilize this same deterministic function; therefore all packets coming from the particular source IP address are guaranteed to reach the same Fragmenter/De-fragmenter. In the preferred embodiment, the deterministic function hashes the value of the complete source address into a value between 0 and n−1 (when n is the number of Fragmenter/De-fragmenter instances). Alternatively, the complete source address, destination address, or destination port may be utilized as an input to the function, as long as a predictable result is obtained.

If a Fragmenter/De-fragmenter instance fails, it is automatically restarted on the same processor or another processor in the Framework. If a VIP Forwarding instance fails, it is automatically restarted on the same processor. The Routed process 13 updates the external routers 22–24 so that a failed VIP Forwarding instance is excluded if the failure is persistent. Therefore the Framework provides both fault tolerance and linearly scalable capacity increases.

At step 36, the Fragmenter/De-fragmenter 12 reassembles the packets, if required. Once the IP packet is reassembled, it can be sent up to the application server. However, since the VIP Framework can operate with a variety of application servers, the Fragmenter/De-fragmenter process 12 must first identify a valid application server for the destination VIP address. At step 37, the Fragmenter/De-fragmenter extracts the destination VIP address from the packets. The process then moves to FIG. 2B, step 41, where the Fragmenter/De-fragmenter maintains an updated server socket list that associates IPC ports with VIP address/server socket combinations. This process is described in more detail in connection with FIG. 3 below. At step 42, the Fragmenter/De-fragmenter identifies from the server socket list, one or more valid application servers. If it is determined at step 43 that more than one valid application server was identified, the process moves to step 44 where the Fragmenter/De-fragmenter selects a single server using a process such as a round-robin selection or load balancing. The process then moves to step 45 where the Fragmenter/De-fragmenter sends the reassembled packets to the selected server using IPC.

Referring now to FIG. 3, there is shown a flow chart illustrating the steps for maintaining an updated list associating IPC ports with VIP address/server socket combinations. At step 51, it is noted that all Fragmenter/De-fragmenters publish an IPC port name within the Framework. When a server uses an API to open a server socket (for example, 80) for a VIP address at step 52, the system call determines that it is a socket for a VIP address. At step 53, the Framework then requests one of the Fragmenter/De-fragmenters to update the list of IPC ports with this new server socket. For the same combination of VIP address/server socket, there may be many IPC ports. Therefore, at 54, a server socket list is distributed and shared between all Fragmenter/De-fragmenters. When a packet comes from any source IP address and reaches a Fragmenter/De-fragmenter, the process extracts the destination VIP address and destination socket (for example, 80) from the packet. The Fragmenter/De-fragmenter then finds, through the server socket list, a valid application server. If a plurality of servers can serve this VIP address and server socket combination, the Fragmenter/De-fragmenter selects one of them. For example, if there are six different processors with FTP servers running on them for this VIP address, then the Fragmenter/De-fragmenter selects one of them. The selection may be based on a round-robin selection or may be enhanced to consider processor load, delays, or other factors. Once the connection is made, all of the other packets for this connection go back to that server and finish their transaction.

Figure 4:
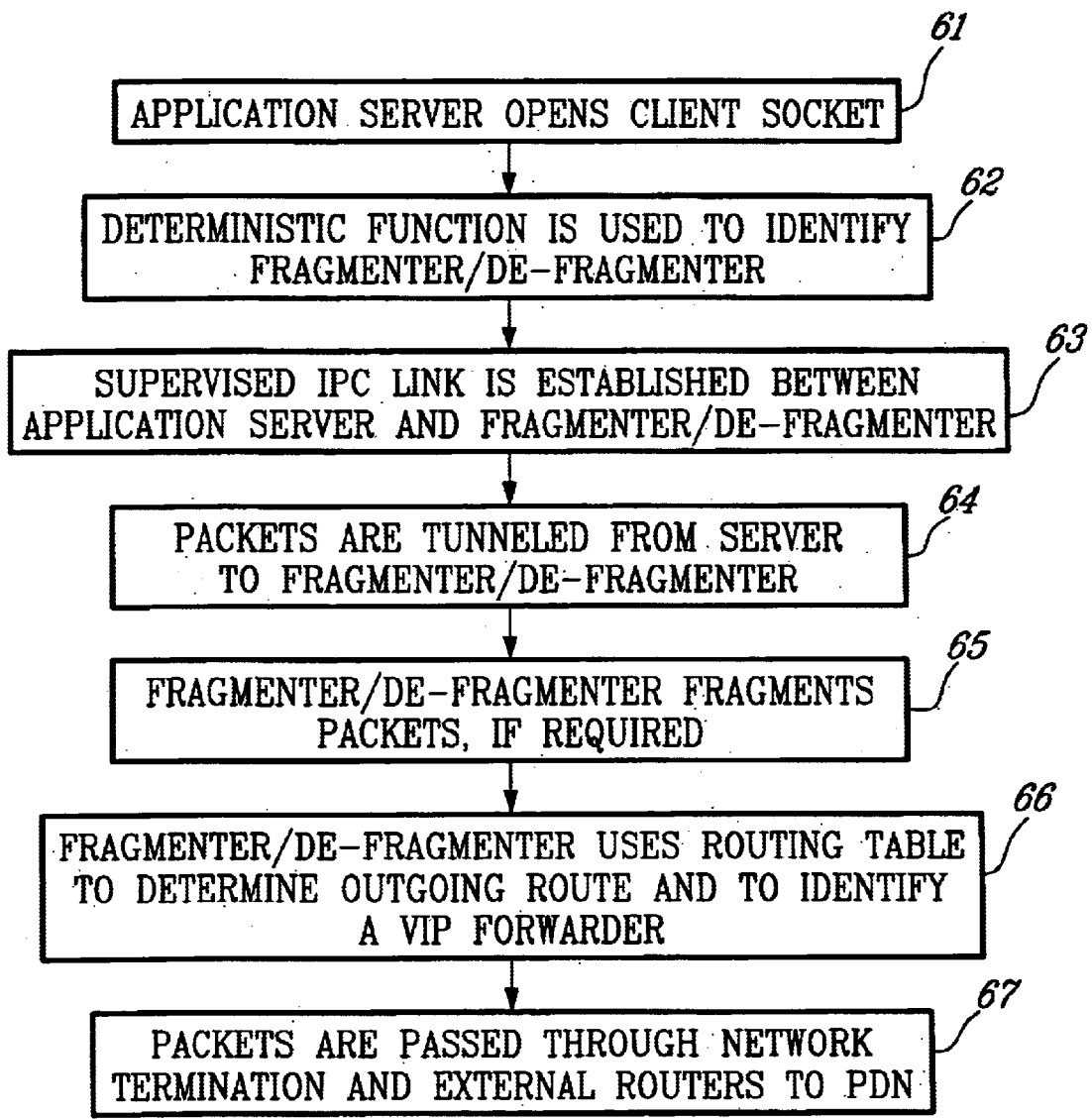
FIG. 4 is a flow chart illustrating the steps of the preferred embodiment of the method of the present invention when an outgoing message is sent from the VIP Framework to a packet data network.

FIG. 4 is a flow chart illustrating the steps of the preferred embodiment of the method of the present invention when an outgoing message is sent from the VIP Framework to the PDN. When an application server such as HTTP-2 15 needs to establish a socket between itself and a remote client, it first opens a client socket at step 61. This client socket is represented by a supervised IPC link between the application and the Fragmenter/De-fragmenter 12a that serves as the reassembly point for the remote IP address. The Fragmenter/De-fragmenter may be identified at step 62 by the same deterministic function that is used by the VIP Forwarders to identify the Fragmenter/De-fragmenter for incoming messages. The system call determines which Fragmenter/De-fragmenter will serve this specific remote IP address and requests the Fragmenter/De-fragmenter to set up the IPC supervised link at 63.

Once the IPC supervised link is set up, the server and the client can use the new client socket to communicate with each other. As noted previously, client packets sent to the server arrive in the Framework through any VIP Forwarder 11 and are forwarded to the server application through the client-specific Fragmenter/De-fragmenter 12 and supervised IPC link. Server packets sent to the client are tunneled at step 64 from the application server to the Fragmenter/De-fragmenter 12 via the supervised IPC link. At step 65, the Fragmenter/De-fragmenter then fragments the packets, if required, and at step 66 uses the routing table in the Routed process 13 to determine which outgoing route should be used. The routing table is a local table that contains a list of VIP Forwarders 11 that can be used to reach specific client IP addresses. For example, there could be a first route for an internal network and another route for an external network. The Routed process may be centralized on a single processor, or may be distributed, with a Routed process running on multiple processors. The Routed process may return a list of VIP Forwarders, or may return a specific VIP Forwarder selected by round-robin or load-balancing procedure. In order to prioritize locally available VIP Forwarders, the routing table entries for locally available VIP Forwarders have a lower METRIC value. At step 67, the packets are passed thorough the network termination 21 and external routers 22–24 to the PDN 25.

It can be seen from the above description that the VIP Framework allows external entities to view the whole Framework as a single IP address while at the same time providing a high degree of scalability and fault-tolerance. For scalability, additional processes can be added at any layer in the VIP Framework. If there are a large number of transactions, for example, more servers can be added without affecting the implementation of the VIP Framework. If there are enough servers, but there is a problem with bandwidth, then more VIP Forwarders can be added. If the capacity of a trunk to a router is exceeded, another trunk can be added without having to change any of the VIP Framework infrastructure.

For fault tolerance, failed processes can be routed around since there are numerous instances of each process running on multiple processors. At the VIP Forwarding layer, there is a physical connection between an Ethernet card on a port and a router. If a VIP Forwarding process 11 fails, outgoing messages can be routed around the failed process to an external router 22–24. For incoming messages, the external router detects the failure and routes the packets to an operational VIP Forwarding process. At the Fragmenter-Defragmenter level, each of the instances of the process has a unique "name address" in the VIP Framework. Thus, a specific instance of this process, running for example on processor 1 or 15, can always be found. If an instance fails and is subsequently restarted, it has the same identity. Since it has a unique identity, messages are routed back to the same instance.

Also contributing to fault tolerance is the fact that all of the state dependencies have been limited or excluded. That is, if a message comes in for a transaction between two processes in the positions of client and server, such as the Fragmenter-De-fragmenter and an HTTP Server, and the Fragmenter-De-fragmenter process fails, the server sends a message back within a few seconds saying that it has a transaction hanging. When the message comes back, the failed Fragmenter-De-fragmenter process will have been restarted, either on the same processor or a different processor in the VIP Framework. The Fragmenter-Defragmenter then continues the transaction and begins forwarding packets to whatever process was active when the Fragmenter-De-fragmenter failed. Thus, the information is not kept in the Fragmenter-De-fragmenter; it is stateless.

Thus, the risk is limited to losing transactions that were being established at the time of process failure. However, protocols such as TCP have error correction mechanisms and make transmission reattempts if fragments are lost. However, the invention is not limited to TCP or other protocols that make retransmission attempts. UDP, for example, intrinsically does not have a retransmission capability because the delivery of the transmission does not have to be guaranteed. In this case, the VIP Framework is consistent with the protocol requirements.

Thus, the advantages of the Framework include linear scalability of the servers, linear scalability of the network interfaces, and high fault tolerance. The Framework is transparent to the clients and the servers, and has minimal impact on the surrounding PDN infrastructure. In addition, since the preferred embodiment operates at the IP level, many different applications can run on top (UDP, HTTP, FTP, etc.). It should be noted that the invention is not limited to the second generation IPv4, but is also applicable to the third generation IPv6.

In addition, the invention is not limited to IP. It can be applied to other protocols as well, so long as they utilize a header identifying the message, and components comprising the message content. For example, in telecommunications, the Signaling System 7 (SS7) protocol is utilized, and the present invention may be implemented with SS7 to provide fault tolerance and scalability in telecommunication networks without having to modify thousands of nodes that are generating traffic toward each other.

The Framework can be implemented at any level in the protocol stack below the application-specific layers. The preferred embodiment is implemented at the IP layer in order to broaden the applicability of the invention and provide the benefits to all protocols that run on IP. The Framework can be implemented at a higher level if it is desired to provide the benefits to a specific application or protocol such as HTTP.

It is thus believed that the operation and construction of the present invention will be apparent from the foregoing description. While the Framework and method shown and described has been characterized as being preferred, it will be readily apparent that various changes and modifications could be made therein without departing from the scope of the invention as defined in the following claims.

What is claimed is:

1. A Framework for providing a fault-tolerant and scalable interface between a plurality of application servers and a packet data network (PDN), said Framework comprising:
   a plurality of network terminations that receive incoming data packets and packet fragments from the PDN, and send outgoing data packets and packet fragments to the PDN;
   a plurality of fragmenter/de-fragmenters that send incoming data packets to the application servers, and receive outgoing data packets from the application servers, each of said fragmenter/de-fragmenters including:
   means for reassembling incoming data packets out of incoming packet fragments;
   means for identifying a valid application server from the plurality of application servers for receiving the reassembled incoming data packets;
   means for fragmenting outgoing data packets into outgoing packet fragments; and
   means for identifying a forwarding process from a plurality of forwarding processes for receiving outgoing data packets and packet fragments;
   a plurality of forwarding processes, each of the forwarding processes being associated with one of the plurality of network terminations, each of said forwarding processes including means for identifying a single fragmenter/de-fragmenter from the plurality of fragmenter/de-fragmenters to receive all of the incoming data packets and packet fragments having a common source address;
   a plurality of interprocess communication (IPC) links between each of the forwarding processes and each of the fragmenter/de-fragmenters; and
   a plurality of IPC links between each of the fragmenter/de-fragmenters and each of the application servers.

2. The Framework of claim 1 wherein the Framework is implemented at any protocol level below an application server level.

3. The Framework of claim 2 wherein the Framework is implemented at the Internet Protocol (IP) level, and the Framework is a Virtual IP (VIP) Framework that supports application servers running any protocol supported by the IP protocol.

4. The Framework of claim 3 wherein the PDN is the Internet, and the network terminations are Ethernet cards.

5. The Framework of claim 2 wherein the Framework is a Signaling System 7 (SS7) Framework that supports application servers running any protocol supported by SS7.

6. The Framework of claim 1 wherein the fragmenter/de-fragmenters enable the application servers to open and close sockets and to send and receive data packets without modification of the application servers.

7. The Framework of claim 1 further comprising a routing process that includes a table of addresses in the Framework and provides external routers in the PDN with addresses of the network terminations.

8. The Framework of claim 7 wherein the table in the routing process specifies specific Framework addresses for specific network terminations.

9. The Framework of claim 7 wherein the network terminations communicate with external routers in the PDN, and appear to the external routers as additional network routers.

10. The Framework of claim 7 wherein the routing process includes a routing table that provides the fragmenter/de-fragmenters with outgoing routing information for outgoing data packets.

11. The Framework of claim 10 wherein the outgoing routing information includes an identity of one of the plurality of forwarding processes where the fragmenter/de-fragmenter should send the outgoing data packets and packet fragments.

12. A Framework for providing a fault-tolerant and scalable interface that receives incoming data packets and packet fragments from a packet data network (PDN) and passes reassembled packets to a plurality of application servers, said Framework comprising:
 a plurality of network terminations that receive incoming data packets and packet fragments from the PDN;
 a plurality of de-fragmenters that send incoming data packets to the application servers, each of said de-fragmenters including:
  means for reassembling incoming data packets out of incoming packet fragments; and
  means for identifying a valid application server from the plurality of application servers for receiving the reassembled incoming data packets;
 a plurality of forwarding processes, each of the forwarding processes being associated with one of the plurality of network terminations, each of said forwarding processes including means for identifying a single de-fragmenter from the plurality of de-fragmenters to receive all of the incoming data packets and packet fragments having a common source address;
 a plurality of interprocess communication (IPC) links between each of the forwarding processes and each of the fragmenter/de-fragmenters; and
 a plurality of IPC links between each of the fragmenter/de-fragmenters and each of the application servers.

13. A Framework for providing a fault-tolerant and scalable interface that receives outgoing data packets from a plurality of application servers and passes outgoing data packets and packet fragments to a packet data network (PDN), said Framework comprising:
 a plurality of forwarding processes;
 a plurality of fragmenters that receive outgoing data packets from the application servers, each of said fragmenters including:
  means for fragmenting outgoing data packets into outgoing packet fragments; and
  means for identifying a forwarding process from the plurality of forwarding processes for forwarding outgoing data packets and packet fragments to a network termination;
 a plurality of network terminations that send outgoing data packets and packet fragments to the PDN, each of the network terminations being associated with one of the plurality of forwarding processes;
 a plurality of interprocess communication (IPC) links between each of the fragmenters and each of the application servers; and
 a plurality of IPC links between each of the fragmenters and each of the forwarding processes.

14. A fault-tolerant and scalable method of interfacing a plurality of application servers with a packet data network (PDN), said method comprising the steps of:
 receiving in a plurality of network terminations, incoming data packets and packet fragments from the PDN;
 associating each of the network terminations with one of a plurality of forwarding process;
 connecting each of the forwarding processes to a plurality of fragmenter/de-fragmenters;
 selecting by each forwarding process, a single fragmenter/de-fragmenter to receive all of the incoming data packets and packet fragments having a common source address;
 sending the incoming data packets and packet fragments having a common source address to the selected fragmenter/de-fragmenter;
 reassembling by the selected fragmenter/de-fragmenter, incoming data packets out of the incoming packet fragments received from the forwarding processes;
 connecting each of the fragmenter/de-fragmenters to the plurality of application servers;
 identifying by the selected fragmenter/de-fragmenter, a valid application server from the plurality of application servers for receiving the reassembled incoming data packets; and
 sending the reassembled incoming data packets from the selected fragmenter/de-fragmenter to the valid application server.

15. The fault-tolerant and scalable method of claim 14 further comprising the steps of:
 selecting by the valid application server, a fragmenter/de-fragmenter from the plurality of fragmenter/de-fragmenters;
 sending outgoing data packets from the valid application server to the selected fragmenter/de-fragmenter;
 identifying by the selected fragmenter/de-fragmenter, a single forwarding process from the plurality of forwarding processes;
 sending the outgoing data packets from the selected fragmenter/de-fragmenter to the identified forwarding process;
 associating by the identified forwarding process, the outgoing data packets with a network termination; and
 sending the outgoing data packets from the associated network termination to the PDN.

16. The fault-tolerant and scalable method of claim 15 further comprising fragmenting by the selected fragmenter/de-fragmenter, the outgoing data packets into outgoing packet fragments.

17. The fault-tolerant and scalable method of claim 16 wherein the step of sending the outgoing data packets from the selected fragmenter/de-fragmenter to the identified forwarding process includes also sending outgoing packet fragments from the selected fragmenter/de-fragmenter to the identified forwarding process.

* * * * *